(12) United States Patent
Wang et al.

(10) Patent No.: US 11,360,587 B1
(45) Date of Patent: Jun. 14, 2022

(54) DEPLOYMENT SYSTEMS FOR COMPUTER SYSTEM FINGER DEVICES

(71) Applicant: Apple Inc., Cupertino, CA (US)

(72) Inventors: Paul X. Wang, Cupertino, CA (US); Alex J. Lehmann, Redwood City, CA (US); Bradley J. Hamel, Portola Valley, CA (US); Dinesh C. Mathew, San Francisco, CA (US); Fletcher R. Rothkopf, Los Altos, CA (US); John C. DiFonzo, Redwood City, CA (US); Keith J. Hendren, Santa Cruz, CA (US); Navpreet S. Kaloty, San Jose, CA (US); Nicholas L. Qu, Vancouver (CA); Scott J. Krahn, Los Gatos, CA (US); Aidan N. Zimmerman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/183,210

(22) Filed: Feb. 23, 2021

Related U.S. Application Data

(60) Provisional application No. 63/006,613, filed on Apr. 7, 2020.

(51) Int. Cl.
*G06F 3/038* (2013.01)
*G06F 3/0338* (2013.01)
(Continued)

(52) U.S. Cl.
CPC .......... *G06F 3/0383* (2013.01); *G06F 3/0202* (2013.01); *G06F 3/0338* (2013.01);
(Continued)

(58) Field of Classification Search
CPC .... G06F 3/0383; G06F 3/0202; G06F 3/0338; G06F 2203/0331; G06F 2203/0384; H02J 50/10
See application file for complete search history.

(56) References Cited

U.S. PATENT DOCUMENTS 6,128,004 A   10/2000  McDowall et al.
8,086,971 B2  12/2011  Radivojevic et al.
(Continued)

FOREIGN PATENT DOCUMENTS

WO    2004044664 A1   5/2004
WO    2009048662 A1   4/2009
WO    2019005586 A1   1/2019

*Primary Examiner* — Jonathan A Boyd
(74) *Attorney, Agent, or Firm* — Treyz Law Group, P.C.; G. Victor Treyz; Kendall P. Woodruff

(57) ABSTRACT

A system may include a finger device that is worn on a user's finger. The finger device may serve as a controller for a head-mounted device or other devices in the system. The finger device may have a foldable housing with hinge structures that allow portions of the housing to fold with respect to each other. Magnets or other bistability structures may be used to provide the folding housing with folding bistability. This allows the housing to be placed in a stable unfolded state that releases the finger or a stable folded state in which the housing snaps over the finger and holds the finger device in place. A base may be used to store the finger device for charging. The base may have deployment structures that help place the finger device on the user's finger for use.

28 Claims, 25 Drawing Sheets

(51) Int. Cl.
*G06F 3/02* (2006.01)
*H02J 50/10* (2016.01)

(52) U.S. Cl.
CPC ............... *G06F 2203/0331* (2013.01); *G06F 2203/0384* (2013.01); *H02J 50/10* (2016.02)

(56) References Cited

U.S. PATENT DOCUMENTS

| | | |
|---|---|---|
| 9,110,505 B2 | 8/2015 | Mastandrea, Jr. |
| 2003/0025721 A1 | 2/2003 | Clapper et al. |
| 2003/0214481 A1 | 11/2003 | Xiong |
| 2006/0238970 A1* | 10/2006 | Ukonaho ............... G06F 1/1681 361/679.01 |
| 2008/0036732 A1 | 2/2008 | Wilson et al. |
| 2008/0059131 A1 | 3/2008 | Tokita et al. |
| 2009/0153365 A1 | 6/2009 | Salsedo et al. |
| 2015/0227203 A1 | 8/2015 | Chen et al. |
| 2015/0277559 A1 | 10/2015 | Vescovi et al. |
| 2016/0058375 A1* | 3/2016 | Rothkopf ............... A61B 5/681 600/301 |
| 2016/0209648 A1 | 7/2016 | Haddick et al. |
| 2019/0346938 A1* | 11/2019 | Wang ..................... G06F 3/044 |

\* cited by examiner

DEPLOYMENT SYSTEMS FOR COMPUTER SYSTEM FINGER DEVICES

This application claims the benefit of provisional patent application No. 63/006,613, filed Apr. 7, 2020, which is hereby incorporated by reference herein in its entirety.

FIELD

This relates generally to electronic devices, and, more particularly, to finger-mounted electronic devices.

BACKGROUND

Electronic devices such as computers can be controlled using computer mice and other input accessories. Input accessories can be used to control content that is displayed on a display and to take other actions. Some input accessories for computer systems may be cumbersome or uncomfortable or may be difficult for a user to deploy.

SUMMARY

A system may include a finger device that is worn on a user's finger. The finger device has sensor circuitry in a housing. The sensor circuitry may include a strain gauge, accelerometer, and/or other sensor circuitry to detect finger input as the housing is moved by the finger. Wireless communications circuitry may be used to supply the finger input to other devices in the system such as a head-mounted device. During operation, finger input may be used to manipulate content displayed by the head-mounted device or other equipment in the system.

The finger device housing may have hinge structures that allow portions of the housing to fold with respect to each other. Magnets or other bistability structures may be used to provide the folding housing with folding bistability. The folding bistability of the housing allows the housing to be placed in a stable unfolded state that releases the finger or a stable folded state in which the housing snaps over the finger and holds the finger device in place.

A base may be used to store the finger device. The base may have wireless power circuitry to wirelessly charge the finger device. In some configurations, the base may have deployment structures that help place the finger device on the user's finger for use and that help remove the finger device for storage. Finger device support structures may form a stand-alone dock, may form an enclosure, may form part of a wearable electronic device, and/or may form other base structures.

DETAILED DESCRIPTION

Figure 1:
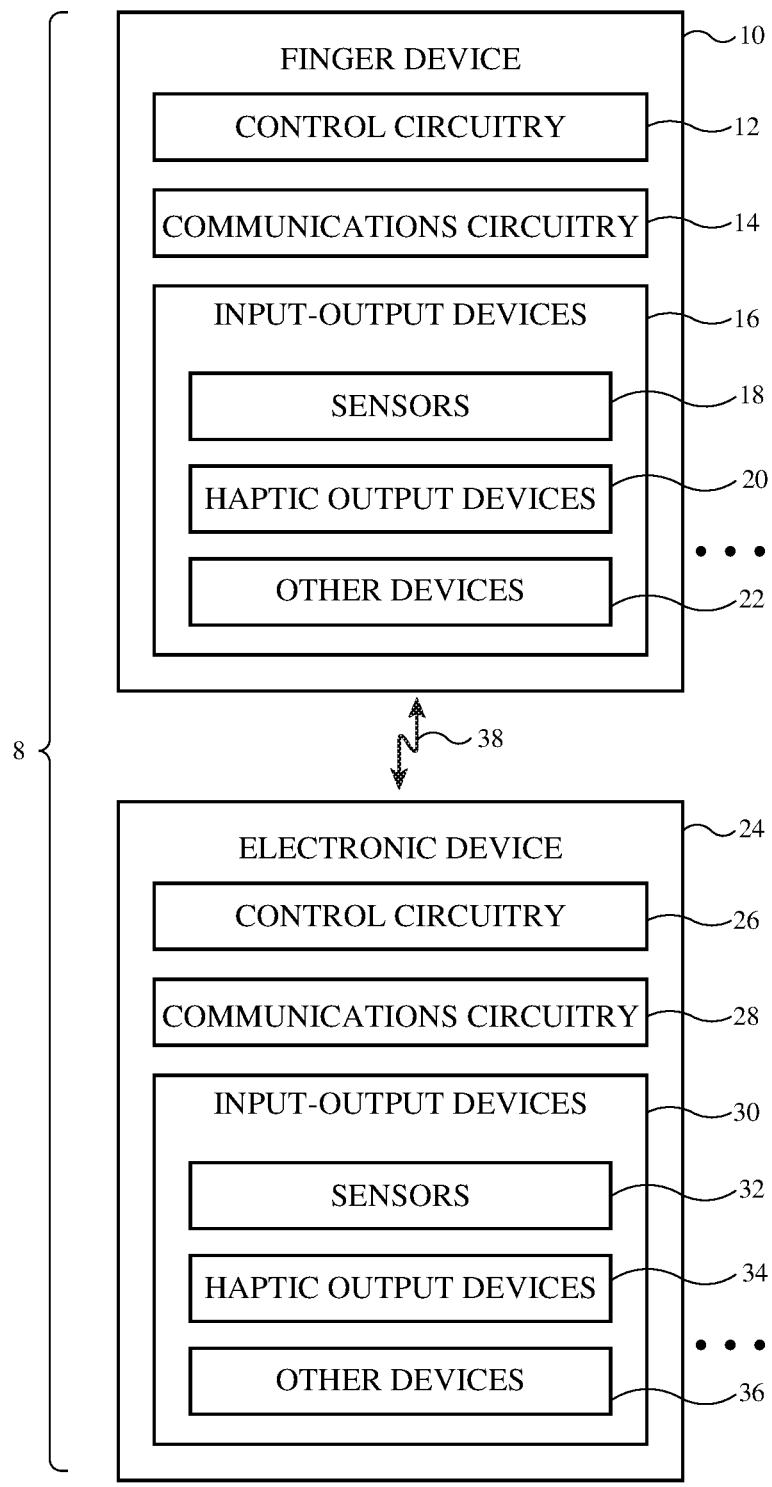
FIG. 1 is a schematic diagram of an illustrative system with a finger device in accordance with an embodiment.

Electronic devices that are configured to be mounted on the body of a user may be used to gather user input and to provide a user with output. For example, electronic devices that are configured to be worn on one or more of a user's fingers, which are sometimes referred to as finger devices or finger-mounted devices, may be used to gather user input and to supply output. A finger device may, as an example, include an inertial measurement unit with an accelerometer for gathering information on figure motions such as finger taps or free-space finger gestures, may include force sensors for gathering information on normal and shear forces in the finger device and the user's finger, and may include other sensors for gathering information on the interactions between the finger device (and the user's finger on which the device is mounted) and the surrounding environment. The finger device may include a haptic output device to provide the user's finger with haptic output and may include other output components.

One or more finger devices may gather user input from a user. The user may use finger devices in operating electronic devices. For example, a finger device may be used as a controller for a virtual reality or mixed reality device (e.g., head-mounted equipment such as glasses, goggles, a helmet, or other device with a display). During operation, the finger devices may gather user input such as information on interactions between the finger device(s) and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using the finger devices. Haptic output may be used, for example, to provide the fingers of a user with a desired texture sensation as a user is touching a real object or as a user is touching a virtual object. Haptic output can also be used to create detents and other haptic effects.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's finger tips while leaving the user's finger pads exposed. This allows a user to touch objects with the finger pad portions of the user's fingers during use. If desired, finger devices may be worn over knuckles on a user's finger, between knuckles, and/or on other portions of a user's finger. Finger devices may have a single segment (e.g., a single housing that fits over the end of a user's finger) or may have multiple segments (e.g., multiple housing portions that are flexibly coupled to each other so that they may be worn on respective segments of a user's finger). One or more finger devices may be worn at a time. The use of a finger device that is worn on a user's fingertip is sometimes described herein as an example.

Users can use finger devices to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, ear buds, or other accessory, or to interact with other electronic equipment.

FIG. 1 is a schematic diagram of an illustrative system of the type that may include one or more finger devices. As shown in FIG. 1, system 8 may include electronic device(s) such as finger device(s) 10 and other electronic device(s) 24. Each finger device 10 may be worn on a finger of a user's hand. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a finger-mounted device having a finger-mounted housing with a U-shaped body that grasps a user's finger or a finger-mounted housing with other shapes configured to rest against a user's finger and device(s) 24 is a cellular telephone, tablet computer, laptop computer, wristwatch device, head-mounted device, a device with a speaker, and/or other electronic device (e.g., a device with a display, audio components, and/or other output components, equipment that includes multiple devices such as a cellular telephone or computer that serves as a host and a head-mounted device that provides display functionality for the host, etc.). A finger device with a U-shaped housing may have opposing left and right sides that are configured to receive a user's finger and a top housing portion that couples the left and right sides and that overlaps the user's fingernail.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors (e.g., two-dimensional touch sensors), optical sensors such as optical sensors that emit and detect light, ultrasonic sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as sensors for measuring blood oxygen content and heart rates sensors, radio-frequency sensors (e.g., sensors that gather position information, three-dimensional radio-frequency images, and/or other information using radar principals or other radio-frequency sensing, sensors that detect position, orientation, and/or motion relative to other objects using Bluetooth® positioning techniques or using Ultra-wideband positioning techniques), muscle activity sensors (EMG) for detecting finger actions, optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors, gas sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and that optionally can be depressed to select items of interest). Alphanumeric keys and/or other buttons may be included in devices 16 and/or 30.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger pulp. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals (e.g., wireless power transmitting coils and wireless power receiving coils, capacitive electrodes for wireless power transmission and/or wireless power reception, etc.).

Figure 2:
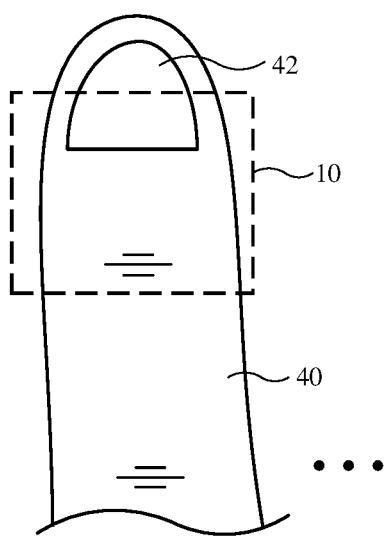
FIG. 2 is a top view of an illustrative finger of a user on which a finger device has been placed in accordance with an embodiment.

FIG. 2 is a top view of a user's finger (finger 40) and an illustrative finger-mounted device 10. As shown in FIG. 2, device 10 may be formed from a finger-mounted unit that is mounted on or near the tip of finger 40 (e.g., partly or completely overlapping fingernail 42). If desired, device 10 may be worn elsewhere on a user's fingers such as over a knuckle, between knuckles, etc. Configurations in which a device such as device 10 is worn between fingers 40 and/or in which a device such as device 10 has a housing configured to be worn on other body parts of a user may also be used.

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

Figure 3:
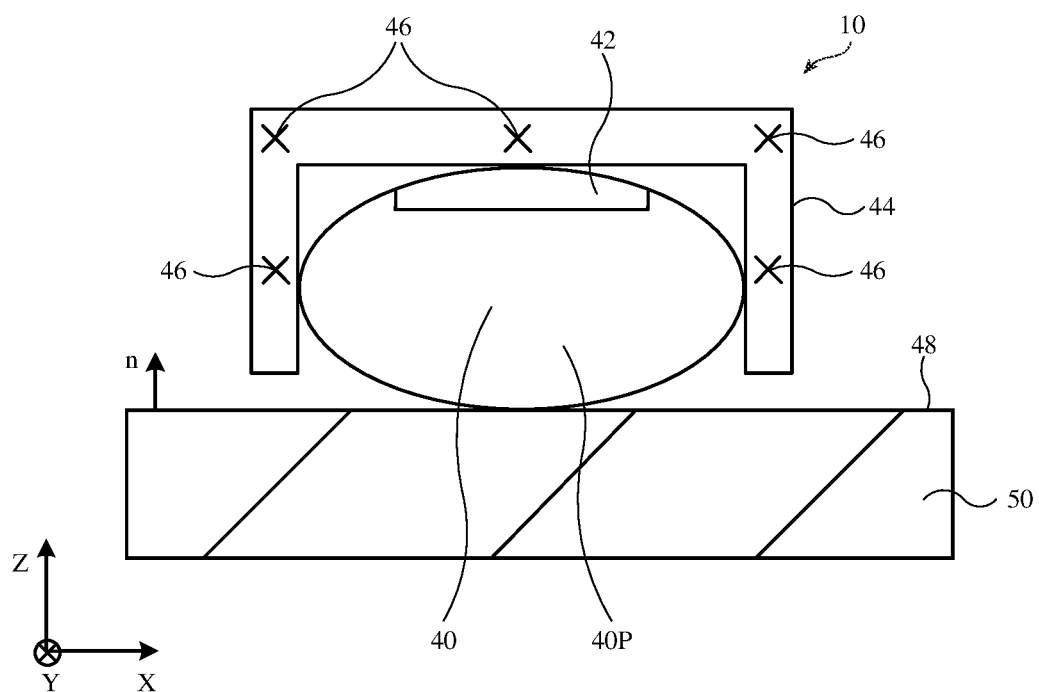
FIG. 3 is a cross-sectional side view of an illustrative finger device on the finger of a user in accordance with an embodiment.

FIG. 3 is a cross-sectional side view of an illustrative finger device (finger-mounted device) 10 showing illustrative mounting locations 46 for electrical components (e.g., control circuitry 12, communications circuitry 14, and/or input-output devices 16) within and/or on the surface(s) of finger device housing 44. These components may, if desired, be incorporated into other portions of housing 44.

As shown in FIG. 3, housing 44 may have a U shape (e.g., housing 44 may be a U-shaped housing structure that faces downwardly and covers the upper surface of the tip of user finger 40 and fingernail 42). During operation, a user may press against structures such as structure 50. As the bottom of finger 40 (e.g., finger pulp 40P) presses against surface 48 of structure 50, the user's finger may compress and force portions of the finger outwardly against the sidewall portions of housing 44 (e.g., for sensing by force sensors or other sensors mounted to the side portions of housing 44). Lateral movement of finger 40 in the X-Y plane may also be sensed using force sensors or other sensors on the sidewalls of housing 44 or other portions of housing 44 (e.g., because lateral movement will tend to press portions of finger 40 against some sensors more than others and/or will create shear forces that are measured by force sensors that are configured to sense shear forces).

Ultrasonic sensors, optical sensors, inertial measurement units, strain gauges and other force sensors, radio-frequency sensors, and/or other sensors may be used in gathering sensor measurements indicative of the activities of finger 40. If desired, these sensors may also be used in mapping the contours of three-dimensional objects (e.g., by time-of-flight measurements and/or other measurements). For example, an ultrasonic sensor such as a two-dimensional image sensor or an ultrasonic sensor with a single ultrasonic transducer element may emit free-space ultrasonic sound signals that are received and processed after reflecting off of external objects. This allows a three-dimensional ultrasonic map to be generated indicating the shapes and locations of the external objects.

In some configurations, finger activity information (position, movement, orientation, etc.) may be gathered using sensors that are mounted in external electronic equipment (e.g., in a computer or other desktop device, in a head-mounted device or other wearable device, and/or in other electronic device 24 that is separate from device 10). For example, optical sensors such as images sensors that are separate from devices 10 may be used in monitoring devices 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices such as light-emitting diodes and/or lasers. The light-emitting devices may be arranged in an asymmetric pattern on housing 44 and may emit light that is detected by an image sensor, depth sensor, and/or other light-based tracking sensor circuitry in device 24. By processing the received patterned of emitted light, device 24 can determine the position, orientation, and/or motion of device 10.

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other finger device tracking arrangements may be used, if desired. In some arrangements, user input for controlling system 8 can include both user finger input and other user input (e.g., user eye gaze input, user voice input, etc.). For example, gaze tracking information such as a user's point-of-gaze measured with a gaze tracker can be fused with finger input when controlling device 10 and/or devices 24 in system 8. The finger input may include information on finger orientation, position, and/or motion and may include information on how forcefully a finger is pressing against surfaces (e.g., force information).

The sensors in device 10 may, for example, measure how forcefully a user is moving device 10 (and finger 40) against surface 48 (e.g., in a direction parallel to the surface normal n of surface 48 such as the −Z direction of FIG. 3) and/or how forcefully a user is moving device 10 (and finger 40) within the X-Y plane, tangential to surface 48. The direction of movement of device 10 in the X-Y plane and/or in the Z direction can also be measured by the force sensors and/or other sensors 18 at locations 46.

Structure 50 may be a portion of a housing of device 24, may be a portion of another device 10 (e.g., another housing 44), may be a portion of a user's finger 40 or other body part, may be a surface of a real-world object such as a table, a movable real-world object such as a bottle or pen, or other inanimate object external to device 10, and/or may be any other structure that the user can contact with finger 40 while moving finger 40 in a desired direction with a desired force. Because motions such as these can be sensed by device 10, device(s) 10 can be used to gather pointing input (e.g., input moving a cursor or other virtual object on a display such as a display in devices 36), can be used to gather tap input, swipe input, pinch-to-zoom input (e.g., when a pair of devices 10 is used), or other gesture input (e.g., finger gestures, hand gestures, arm motions, etc.), and/or can be used to gather other user input.

In general, user input gathered by device 10 may be used in controlling any suitable operations in system 8. As an example, system 8 (e.g., one or more devices such as device 24 and/or other equipment in system 8) may change the content displayed for a user by a display device (e.g., a head-mounted display in a head-mounted device or other display) in response to the user input. A pointer may be moved within a displayed image (e.g., to point to a virtual object or real-world object in the user's field of view), lines may be drawn by moving a pointer or virtual paintbrush, content can be scrolled (e.g., in response to user scroll up and scroll down commands received by monitoring deformation of the item), etc. Highlight regions (e.g., a computer-generated visual highlighting element such as a ring, enlarged area, brightened or darkened area, etc.) may also be moved in response to user input. User input may be used to direct system 8 to select highlighted items (e.g., to launch an application, to select media for playback, to perform a file action such as deleting, copying, renaming, etc.). If desired, user input may be used to change pages of displayed content (e.g., to advance through pages in a visual presentation, to move through the pages of a book, etc.). User input may also be used to adjust audio settings, to select a media track, to perform fast forward, reverse, pause, stop, and play operations, and/or to otherwise control the playback of media content containing video, audio, and/or haptic feedback. System 8 may have user adjustable settings such as account settings, user playback settings, and/or other settings. User input from device 10 may be used in adjusting these settings and/or other adjustable parameters in system 8. Device 10 may, as an example, provide finger input information directly to device 24 (e.g., a head-mounted display device) or may provide finger input information to a first device (e.g., a computer or cellular telephone serving as a host) while the first device uses a display in a second device (e.g., a display in a head-mounted device) to display content in response to the finger input information.

If desired, finger device 10 may be placed on a user's finger by pressing housing 44 into place over the top of the tip of the finger. This type of arrangement, which may sometimes be referred to as a press-fit or friction-fit arrangement, may accommodate a range of finger sizes, particularly in configurations in which housing 44 has portions that deform (e.g., by flexing). When it is desired to remove device 10 from the user's finger, housing 44 may be pulled off of the tip of the user's finger.

Another illustrative arrangement involves providing device 10 with one or more hinges or other structures that allow device 10 to fold and unfold. When it is desired to attach device 10 to the user's finger, device 10 can be folded into its folded state so that device 10 squeezes inwardly against the sides of the user's finger. When it is desired to remove device 10 from the user's finger, device 10 can be unfolded and thereby freed from the finger.

Figure 4:
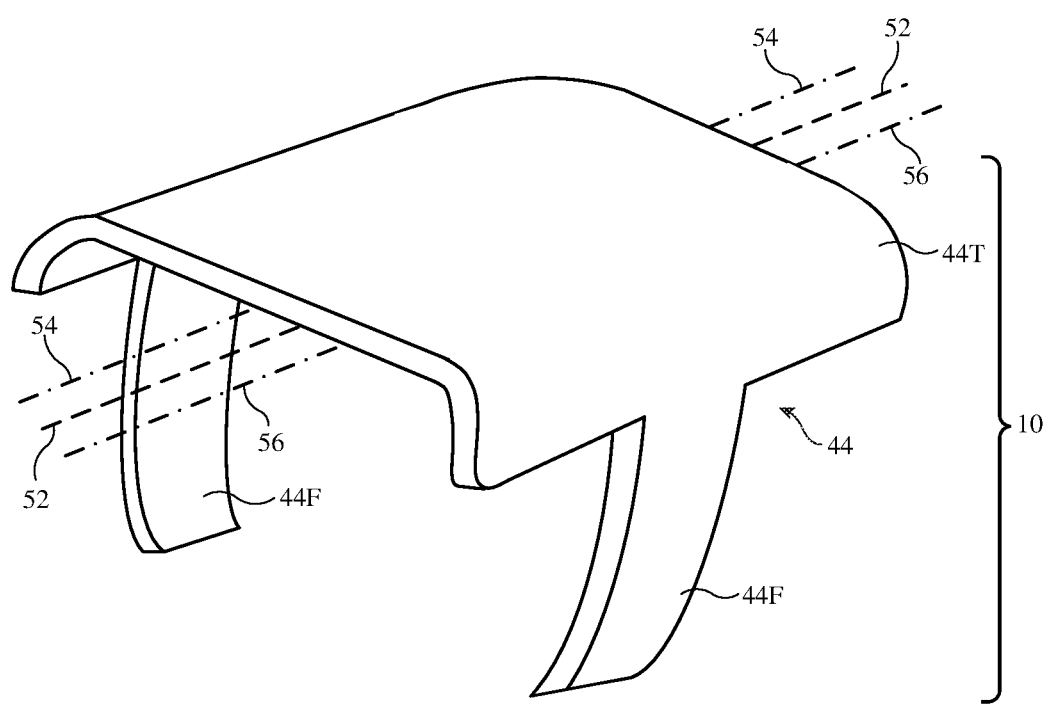
FIG. 4 is a perspective view of an illustrative finger device with hinge in accordance with an embodiment.

FIG. 4 is a perspective view of finger device 10 in an illustrative configuration in which device 10 is foldable. In the example of FIG. 4, housing 44 of device 10 has an upper housing portion 44T that spans the upper portion of the user's finger and has opposing left and right side housing portions 44F that respectively press against the left and right sides of the user's finger. Hinge structures formed from one or more hinges may be provided in housing 44 to allow housing 44 to fold and unfold.

As a first example, a single hinge may be formed along the center of housing portion 44T to allow housing 44 to fold and unfold by rotation about rotational (fold) axis 52.

As a second example, a pair of parallel hinges may be formed in housing 44. A first of the hinges may extend along first fold axis (hinge axis) 54 and a second of the hinges may extend along a parallel fold axis such as second fold axis (hinge axis) 56. In this type of arrangement, housing 44 may fold along both axis 54 and axis 56. In some configurations, the hinges may include interlocking elements that impart rotational friction (e.g., the hinges may be friction hinges) to help lock the fold position of device 10. In other configurations, rotational friction from the hinges may be reduced.

In general, a single hinge, a pair of hinges, or three or more hinges or other foldable structures may be provided in housing 44 to allow device 10 to fold (and unfold). Configurations in which housing 44 folds about a single hinge may sometimes be described herein as an example. This is illustrative. Any suitable hinge structures may be used, if desired.

Figure 5:
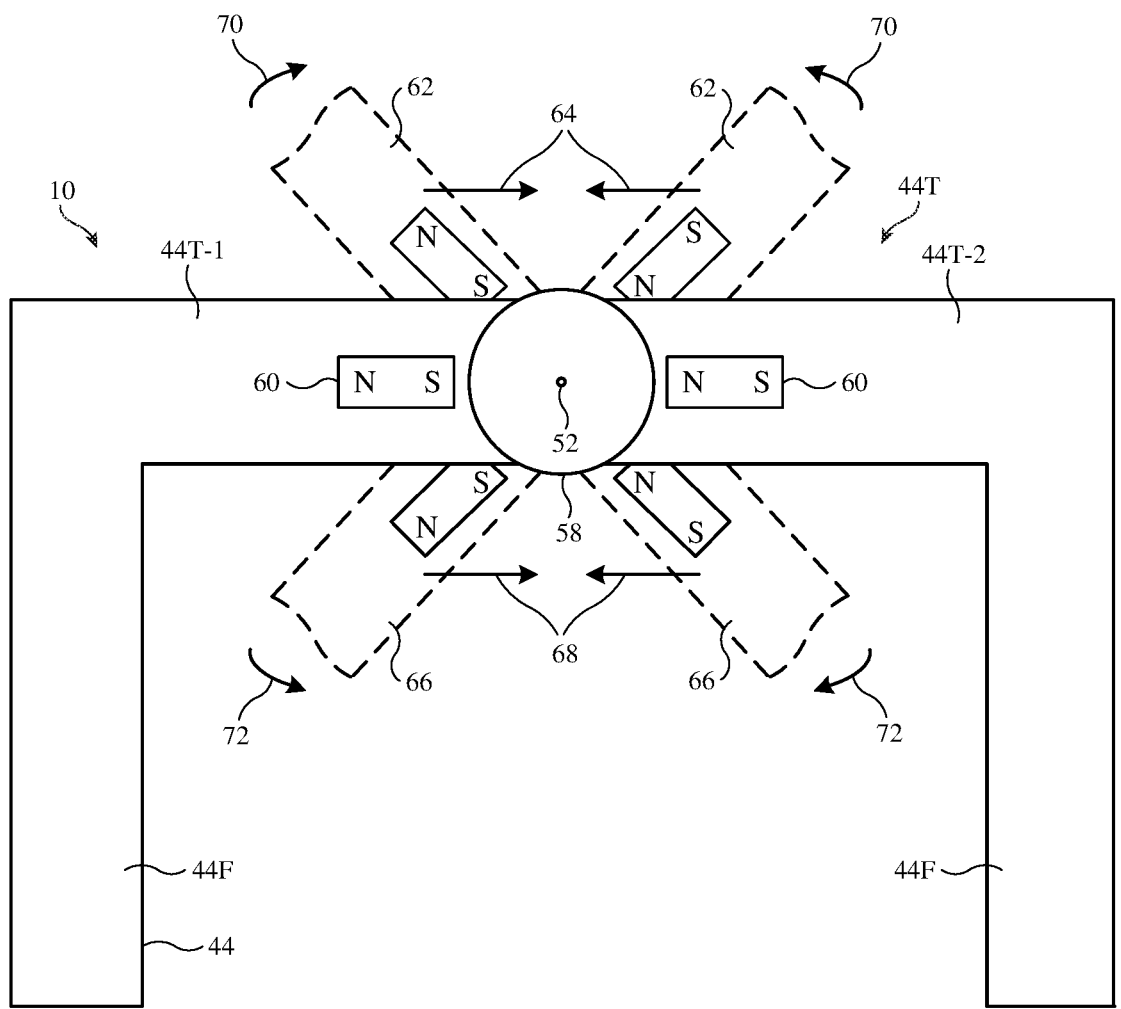
FIG. 5 is a cross-sectional side view of an illustrative finger device with magnetic structures to provide folding bistability that helps the user remove the finger device from the user's finger and that helps the user attach the finger device to the user's finger in accordance with an embodiment.

Device 10 may be held in a desired shape using friction hinges and/or device 10 may be provided with bistability structures such as magnets or bistable spring structures that provide housing 44 with folding bistability. FIG. 5 is a cross-sectional view of an illustrative finger device in an illustrative configuration using magnets to provide bistability. As shown in FIG. 5, upper housing portion 44T has first portion 44T-1 and second portion 44T-2 that are joined by hinge 58 and configured to rotate about fold axis 52. Magnets 60 are provided in housing 44. In the example of FIG. 5, magnets 60 are aligned so that the magnetic axis of each magnet is horizontal. Other configurations (e.g., configurations with diagonally oriented magnetic axes) may be used, if desired. Magnets 60 may be formed from discrete magnet structures (e.g., individual magnets) or may be formed from magnetic material that has multiple polarization zones forming physically continuous and magnetically separate magnets serving as a magnet array. Configurations in which magnets 60 are individual magnets may sometimes be described as an example. In general, each magnet 60 may include one or more magnetic polarization zones and/or multiple individual magnets.

When portions 44T-1 and 44T-2 of FIG. 5 are horizontally aligned, magnets 60 attract each other (e.g., because the south pole of the left magnet faces the north pole of the right magnet). Nevertheless, the even alignment of portions 44T-1 and 44T-2 on opposing sides of hinge 58 tends to prevent any movement of portions 44T-1 and 44T-2 relative to each other.

When portions 44T-1 and 44T-2 are moved in directions 70 to open device 10, housing 44 begins to unfold outwardly about fold axis 52. The movement of portions 44T-1 and 44T-2 in directions 70 tends to bring the north pole of the left magnet into alignment with the south pole of the right magnet. As a result, these poles of magnets 60 are attracted towards each other in directions 64, helping to move portions 44T-1 and 44T-2 further in directions 70 to snap open device 10. This movement continues until stopped by stop structures in hinge 58 or until housing portions 44T-1 and 44T-2 can otherwise no longer unfold any further. Similarly, when portions 44T-1 and 44T-2 are moved in directions 72 to close device 10 around a user's finger, housing 44 begins to fold inwardly about fold axis 52. The movement of portions 44T-1 and 44T-2 in directions 72 tends to bring the north pole of the left magnet into alignment with the south pole of the right magnet. As a result, these poles of magnets 60 are attracted towards each other in directions in directions 68, helping to move portions 44T-1 and 44T-2 further in directions 72. Portions 44T-1 and 44T-2 therefore move inwardly as much as possible toward the sides of the user's finger, snapping device 10 shut, squeezing housing 44 around the user's finger, and securing device 10 to the user's finger.

As this example demonstrates, the inclusion of magnets 60 in portions 44T-1 and 44T-2 of housing 44 therefore creates folding bistability. In a first stable state (sometimes referred to as the open or unfolded state), the left and right sides of housing 44 are moved in directions 70, so that housing portions 44F click open to release the user's finger. In a second stable state (sometimes referred to as the closed or folded state), the left and right sides of housing 44 are moved in directions 72, so that housing portions 44F click closed and grip the user's finger. The condition where housing portions 44T-1 and 44T-2 are horizontally aligned across hinge 58 corresponds to an unstable condition that separates the first and second stable states. Housing 44 tends not to remain in the unstable condition, because the first and second states are favored and more stable.

In the example of FIG. 5, hinge 58 is located between magnets 60. If desired, hinge 58 may be offset from the line of the magnets to put the unstable equilibrium at any desired place and so make the equilibrium angle any desired value.

If desired, bistability may be provided using other types of bistable elements (e.g., springs). The use of magnets to provide device 10 with folding bistability is illustrative.

When device 10 is provided with folding bistability, device 10 will tend to snap into place about a user's finger during folding operations. Device 10 will remain attached to the user's finger unless sufficient unfolding force is applied to device 10. Once device 10 is sufficiently unfolded, device 10 will tend to snap into its unfolded state.

An item such as a base may be provided with magnets or other structures to help a user attach and remove finger device 10. The base, which may sometimes be referred to as a stand, dock, storage structure, or garage, may be a stand-alone item (e.g., a countertop dock, a removable battery case, etc.) or may form part of an electronic device such as a wearable electronic device. In some configurations, such as when the base forms a battery case, the housing of the base forms an enclosure with an interior region that is configured to receive device 10. As described in connection with the example of FIG. 5, hinge 58 may, if desired, be offset from an axis that extends between magnets 58 to put the unstable equilibrium at any desired place and so make the equilibrium angle any desired value (e.g., to facilitate the opening and/or closing of device 10 as device 10 is stowed on the base and removed from the base).

Figure 6A:
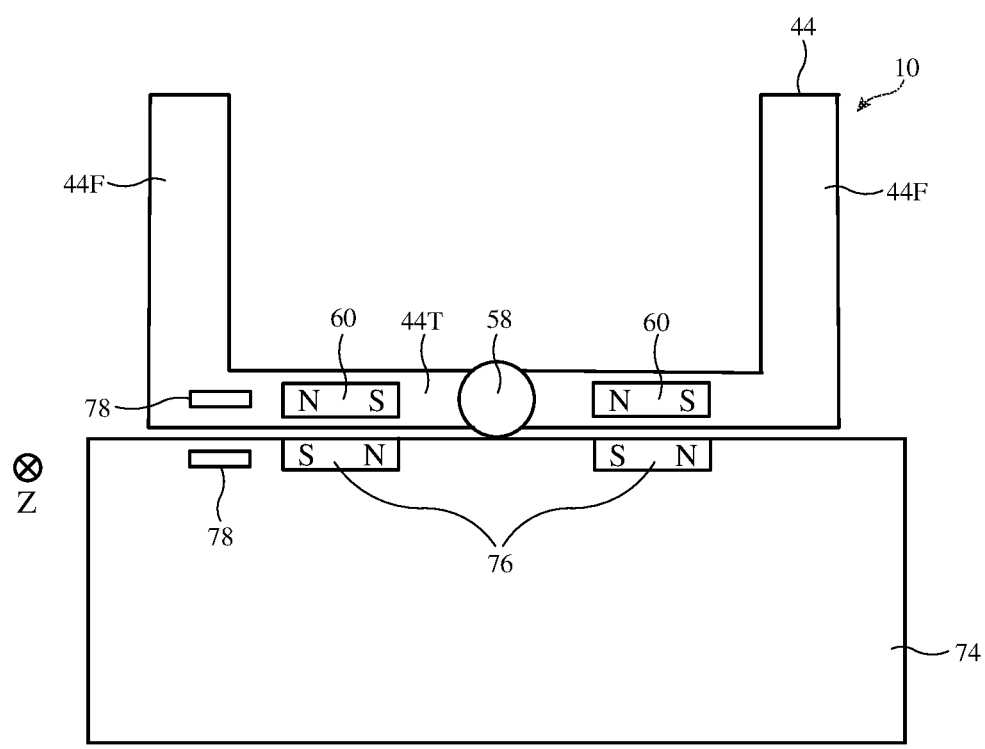
FIG. 6A is a cross-sectional side view of an illustrative finger device that is attached magnetically to a base in accordance with an embodiment.

Magnets in the item may, for example, help hold device 10 in its open state while a user inserts a finger between side portions 44F of housing 44. Consider, as an example, base 74 of FIG. 6A. As shown in FIG. 6A, device 10 may be placed upside down on base 74 so that magnets 60 of device 10 are attracted to corresponding magnets 76 of base 74. This holds device 10 in an open configuration. Support structures for device 10 such as base 74 may include circuitry such as the circuitry of device 10 and/or device 24 of FIG. 1. For example, bases such as base 74 may have wireless power circuitry 78. Device 10 may also have wireless power circuitry 78. Using wireless power circuitry 78 (e.g., coils for transmitting and/or receiving wireless power, etc.) base 74 may charge a battery in device 10. For example, base 74 may wirelessly transmit power from a battery in base 74 or may wirelessly transmit power received from a wall outlet or other power source to device 10. Device 10 may receive this wireless power and may use the received power to charge an internal battery and/or power other circuitry in device 10.

When a user desires to use device 10, the user may insert finger 40 between housing portions 44F (with fingernail 42 facing down in the example of FIG. 6A). The user may then slide device 10 in direction Z (into the page of FIG. 6A).

Figure 6B:
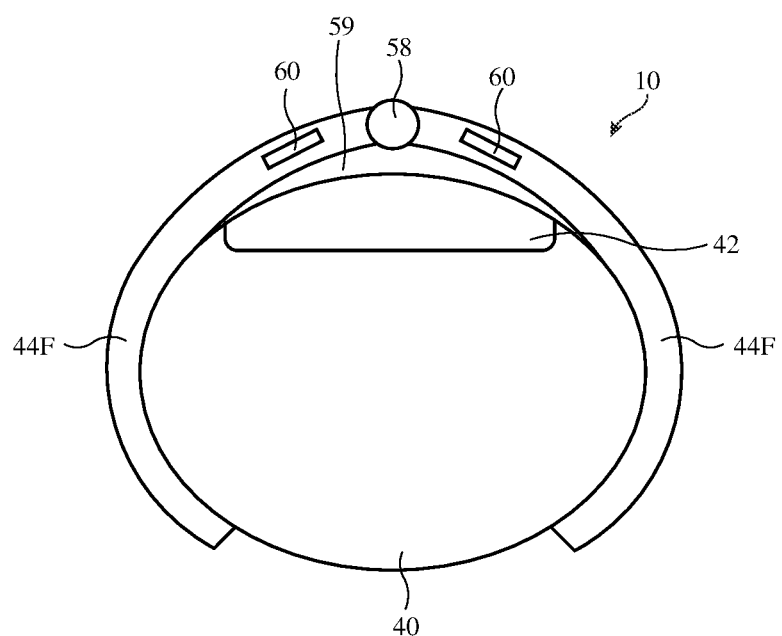
FIG. 6B is a cross-sectional side view of an illustrative finger device in a first stable state in which the finger device is being worn on a finger of a user in accordance with an embodiment.
Figure 6C:
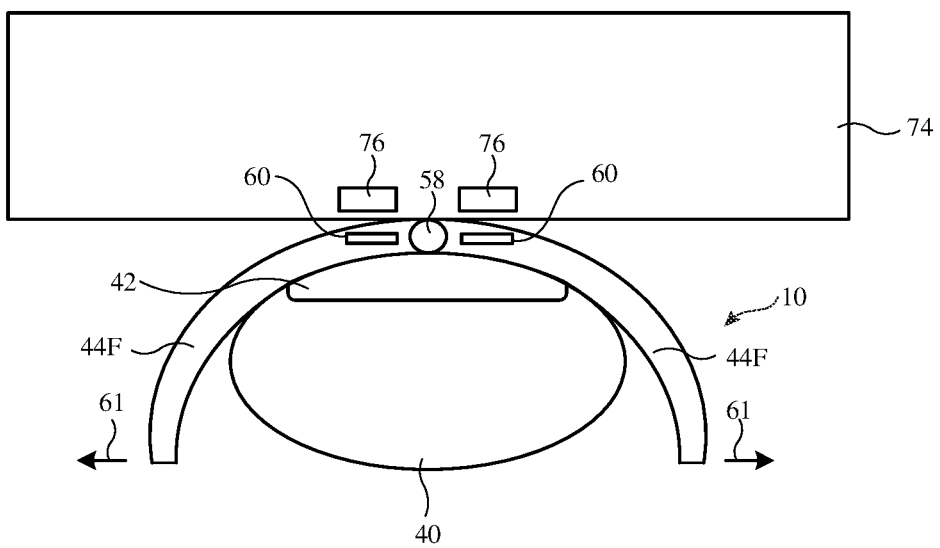
FIG. 6C is a cross-sectional side view of the illustrative finger device of FIG. 6B in a second stable state in which the finger device is released from the finger of the user and stored on a base in accordance with an embodiment.

FIGS. 6B and 6C are cross-sectional side views of an illustrative finger device in respective first and second stable states.

In the configuration of FIG. 6B, device 10 is in a first stable state in which housing portions 44F are biased inwardly and grip the sides of finger 40. In this state, a user is wearing and using device 10. An air gap 59 may be present at the top of finger 40 above fingernail 42. When a user desires to remove device 10 from finger 40 for storage, device 10 may be pressed against base 74 (FIG. 6C), causing hinge 58 to move towards fingernail 42 (e.g. to eliminate air gap 59). The movement of hinge 58 towards fingernail 42 causes housing portions 44F to move outwardly in directions 61 of FIG. 6C, thereby releasing finger 40. After finger 40 has been removed from device 10, magnets 76 and 60 hold device 10 against base 74 so that device 10 may remain in a second stable state in which device 10 is stored on base 74 for subsequent use.

Figure 7:
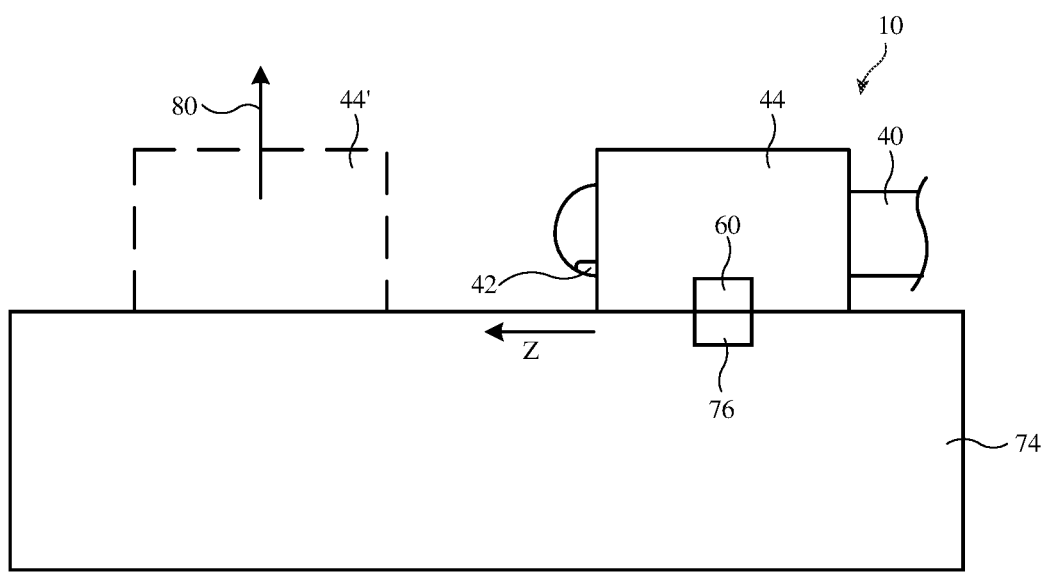
FIG. 7 is a cross-sectional side view of an illustrative base with magnets showing how a user may slide the finger device along the surface of the base to move the device away from the magnets in the base in accordance with an embodiment.

As shown in FIG. 7, magnets 76 may be located at only one end of base 74. When housing 44 is located over magnets 76, magnets 76 attract magnets 60 in housing 44 and hold device 10 open. When housing 44 is slid in direction Z by finger 40 to location 44', magnets 60 move out of alignment with magnets 76. As a result, magnets 60 are released from magnets 76 when housing 44 is in position 44'. Housing 44 therefore folds about finger 42. The user may then lift finger 42 and device 10 away from base 74 in direction 80 so that device 10 may be used to control equipment in system 8.

Figure 8:
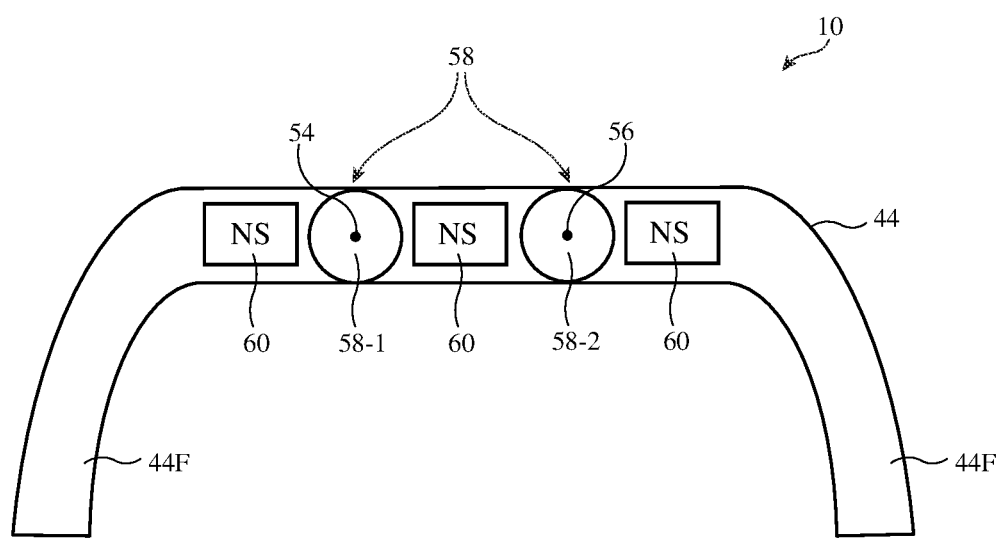
FIG. 8 is a cross-sectional side view of an illustrative finger device with three magnets in accordance with an embodiment.

FIG. 8 is a cross-sectional view of device 10 in an illustrative configuration in which device 10 has a hinge structure formed from a pair of parallel hinges. As shown in FIG. 8, hinge 58 (sometimes referred to as hinge structures, hinges, etc.) includes first hinge 58-1 that allows the left side of housing 44 and a center portion of housing 44 to rotate with respect to each other about axis 54 and second hinge 58-2 that allows the right side of housing 44 and the center portion of housing 44 to rotate with respect to each other about axis 56. This hinge structure configuration allows housing portions 44F to fold relative to each other to attach and detach device 10 from a user's finger. Magnets 60 (e.g., neodymium magnets or other permanent magnets) include a left magnet, a center magnet, and a right magnet with aligned poles and correspondingly aligned magnetic axes. This arrangement provides housing 44 with folding bistability about axis 54 and folding bistability about axis 56.

Figure 9:
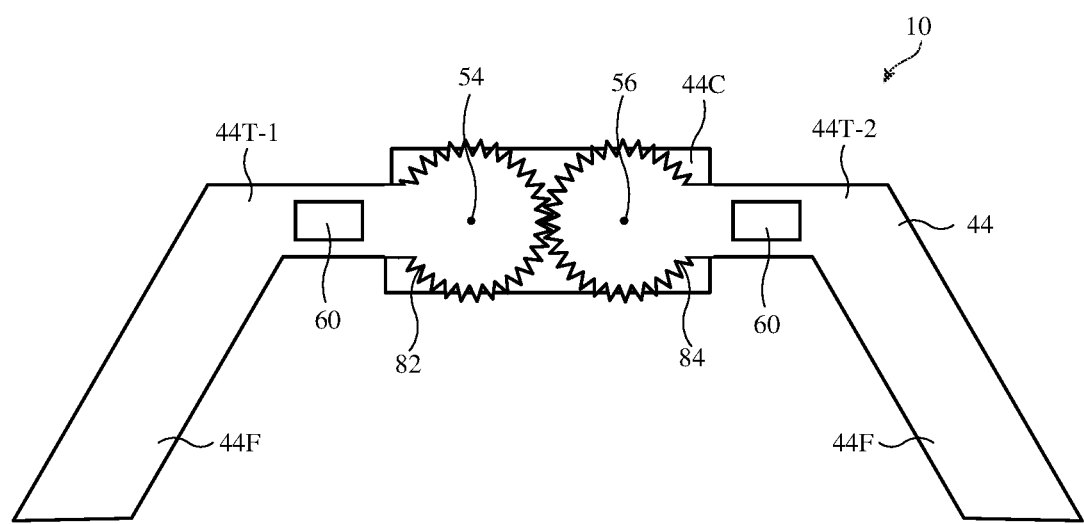
FIG. 9 is a cross-sectional side view of an illustrative finger device with interlocking gears in accordance with an embodiment.

If desired, gears or other structures may be used for synchronizing the motion of separate housing portions in device 10 during folding and unfolding operations. Consider, as an example, device 10 of FIG. 9. As shown in FIG. 9, housing portion 44T-1 may have first gear 82, which rotates about axis 54, and housing portion 44T-2 may have an interlocked second gear 84, which rotates about axis 56. The teeth of gears 82 and 84 mesh with each other, so that folding movement of one of side portions 44F induces a synchronized folding movement of the other of side portions 44. This helps ensure that folding of the sides of device 10 is symmetric with respect to central housing portion 44C.

Figure 10:
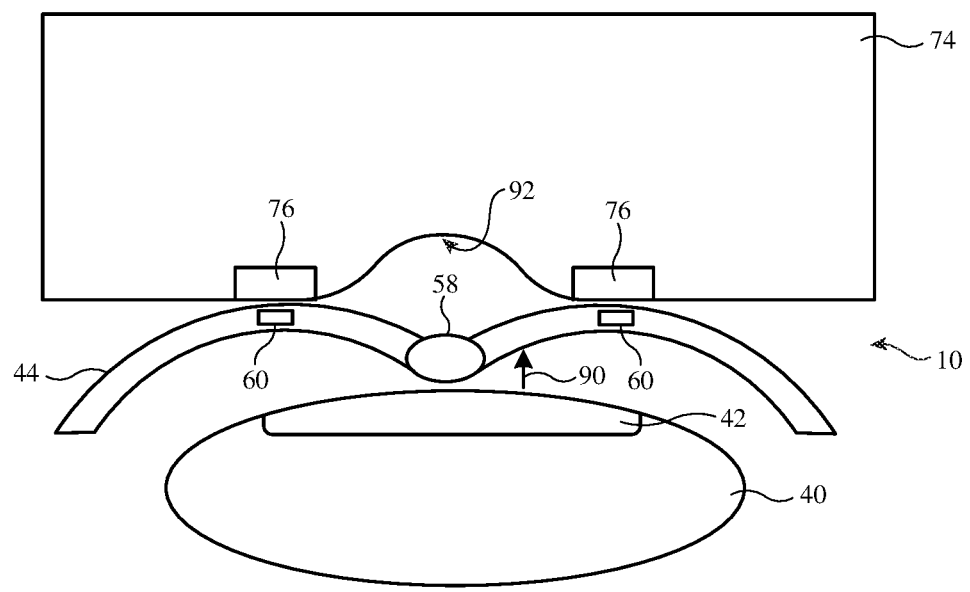
FIGS. 10, 11, 12, 13, 14, and 15 are cross-sectional side views of illustrative finger devices and associated bases in accordance with embodiments.

FIG. 10 is a side view of device 10 being deployed from a base by upward movement of finger 40. A shown in FIG. 10, housing 44 of device 10 may have magnets 60 that are attracted to magnets 76 in base 74 for storage of device 10. When it is desired to detach device 10 from base 74 and to attach device 10 to finger 40, a user may move finger 40 upwards in direction 90, thereby pressing the middle of housing 44 and hinge 58 upward into recess 92 of the housing of base 74. The shape of housing 44 creates lever arms that cause magnets 60 to separate downwardly from magnets 76 as housing 44 is pushed upwards, thereby releasing device 10 onto the user's finger. Magnets 60 may provide folding bistability, so that device 10 snaps onto finger 40 once released from base 74.

Figure 11:
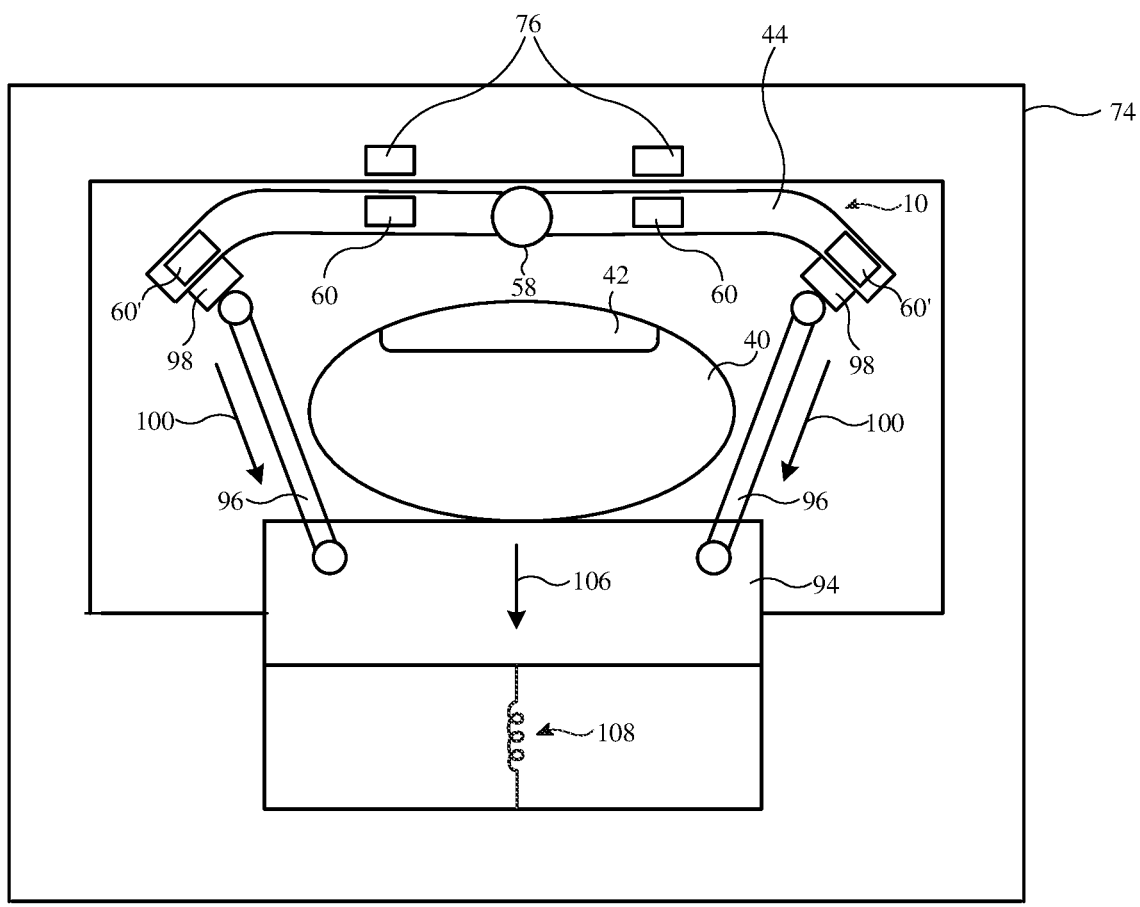

FIG. 11 is a side view of another illustrative base arrangement. In the example of FIG. 11, base 74 has magnets 76 that attract magnets 60 in housing 44 of device 10 to hold device 10 in place for storage. When a user desires to wear device 10, the user places finger 40 onto button 94 and presses downwardly in direction 106 to compress button spring 108. This moves linkage members 96 in directions 100 and moves magnets 98 at the end of members 96 in directions 100. Magnets 98 may attract magnets 60 or other magnets such as magnets 60', so that movement of linkage members 96 in directions 100 causes the sides of housing 44 to move downwardly in directions 100, thereby folding device 10 about finger 40. Finger 40 and device 10 may then be removed from base 74.

Figure 12:
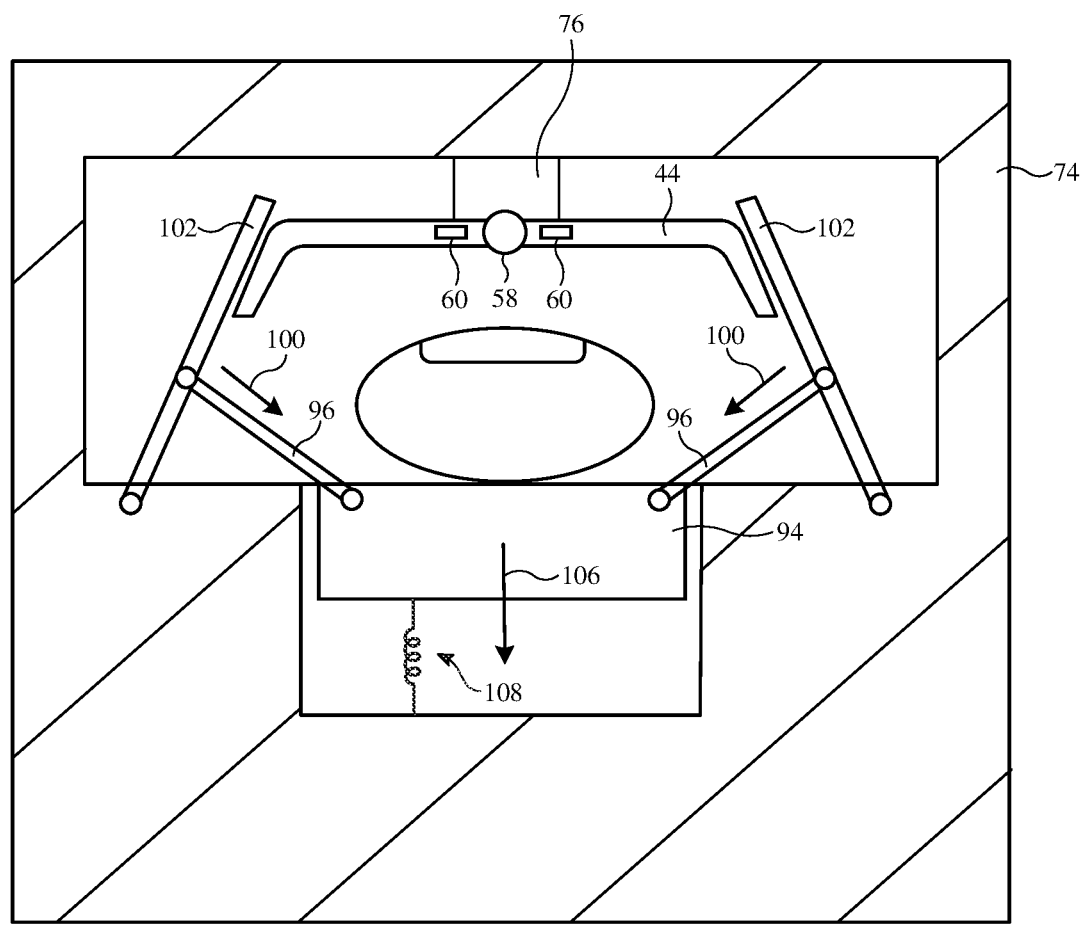

In the illustrative configuration of FIG. 12, base 74 has movable side members 102 that are pulled in directions 100 by linkage members 96 when button 94 is depressed to compress spring 108. When a user presses downwardly on button 94 in direction 106, members 102 fold device 10 onto finger 40, releasing magnets 60 in housing 44 from magnet 76 of base 74.

Figure 13:
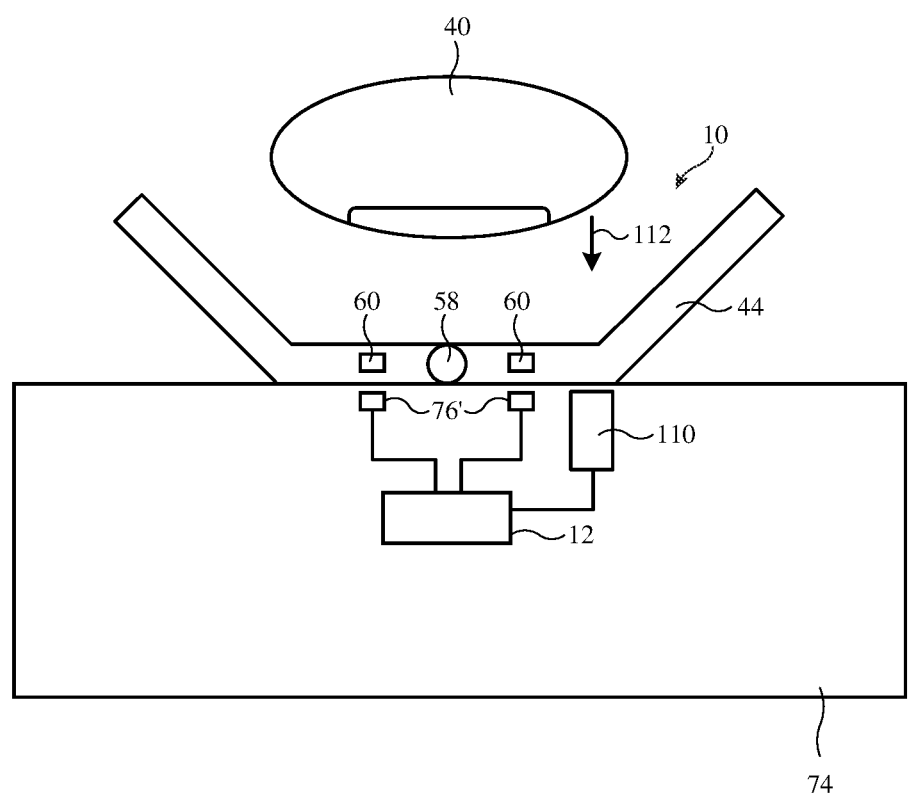

FIG. 13 shows how control circuitry 12 in base 74 (see, e.g., control circuitry 12 of device 10 of FIG. 1), may be used in releasing device 10. As shown in FIG. 13, base 74 may have a sensor such as sensor 110 that senses when finger 40 is approaching device 10 in direction 112. Sensor 110 may be, for example, an optical proximity sensor, a capacitive proximity sensor, a force sensor that detects pressure on base 74, a touch sensor, and/or other sensor that senses the presence of finger 40. In response to sensing the presence of finger 40, control circuitry 12 adjusts switchable magnets 76' to repel rather than attract magnets 60. This forces the sides of housing 44 upward to fold about hinge 58 onto finger 40.

Figure 14:
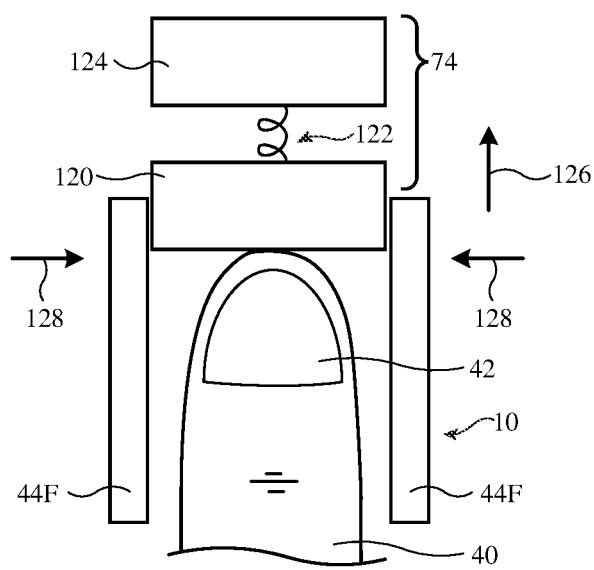

FIG. 14 is a cross-sectional top view of device 10 and base 74 in an illustrative configuration in which a longitudinally actuated button is used to deploy device 10. In the example of FIG. 14, base 74 has a button such as button 120. Spring 122 is coupled between button 120 of base 74 and support structure 124 of base 74. When a user desires to wear device 10, the user places finger 40 between side portions 44F of device 10. Top housing portion 44T, which is not shown in FIG. 14, links portions 44F together. In the position shown in FIG. 14, button 120 rests between side portions 44F, overcoming the inward force produced by side portions 44F due to the folding bistability of device 10. This holds portions 44F apart and allows the user to place finger 40 between side portions 44F. The user may then press button 120 in direction 126, thereby compressing springs 122 and sliding button 120 out from between portions 44F. When button 120 is no longer between portions 44F, portions 44F move towards each other in directions 128 and device 10 folds onto finger 40.

Figure 15:
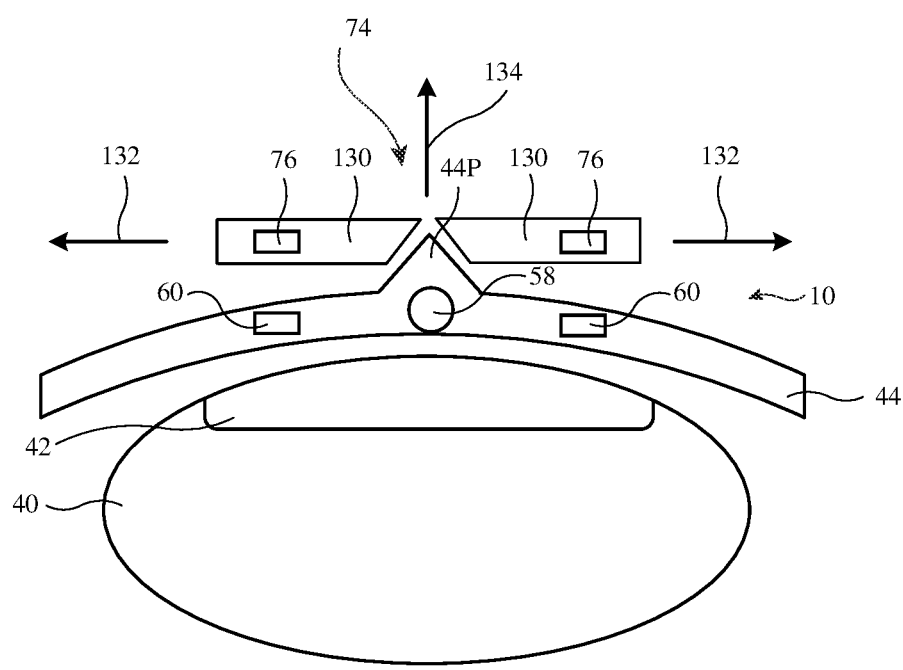

In the example of FIG. 15, housing 44 has protrusion 44P. During device storage, magnets 76 in movable members 130 of base 74 are aligned with magnets 60 in housing 44 of device 10, thereby holding device 10 against base 74. When a user desires to wear device 10, the user may push finger 40 upwards in direction 134. This causes the slanted surfaces of protrusion 134 to press members 130 outwardly in directions 132. As members 130 move away from each other, magnets 76 are moved out of alignment with magnets 60, thereby releasing device 10. When device 10 is released from base 74, the folding bistability provided by magnets 60 snaps housing 44 onto finger 40.

Figure 16:
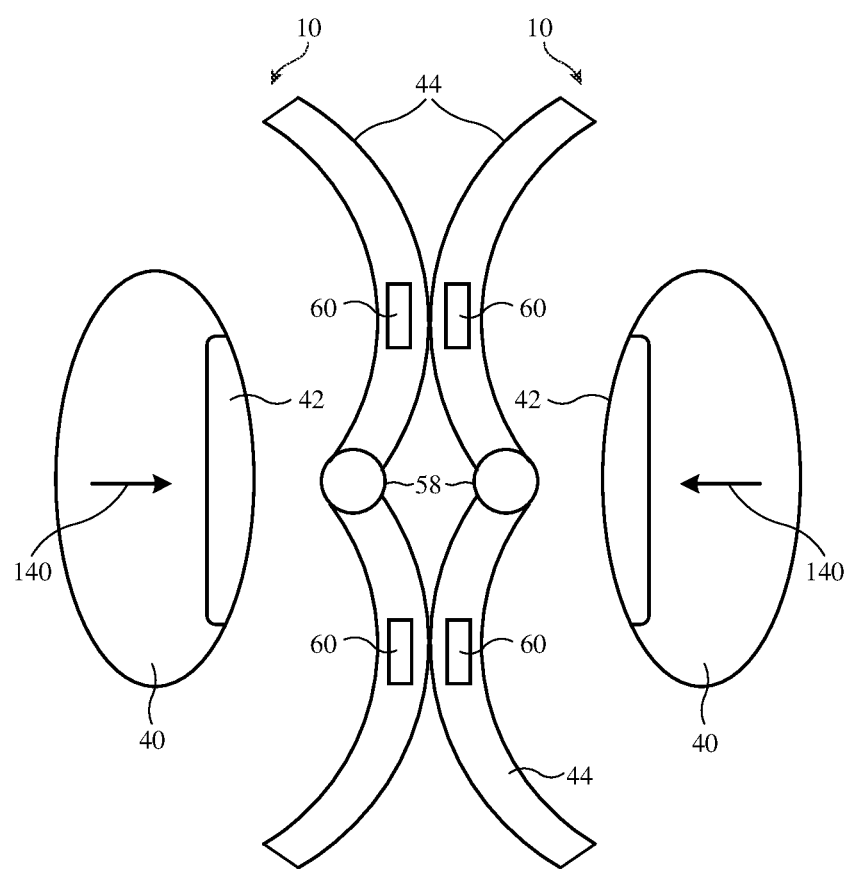
FIG. 16 is a cross-sectional side view of a pair of back-to-back finger devices being attached to first and second respective fingers in accordance with an embodiment.

As shown in FIG. 16, two of devices 10 may be attached back to back using magnets 60. When a user desires to wear devices 10 on fingers 40, fingers 40 may be pressed inwardly between the sides of housings 44 in directions 140. This causes portions of housing 44 in each of devices 10 to bear against each other, moving magnets 60 in opposing devices 10 apart from each other. When magnets 60 are moved sufficiently far apart, devices 10 will release each other. The folding bistability of devices 10 will then cause each device 10 to snap closed on a respective finger 40.

Figure 17:
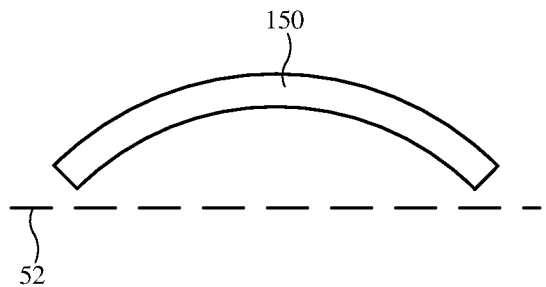
FIG. 17 is a cross-sectional end view of an illustrative bistable strip in accordance with an embodiment.
Figure 18:
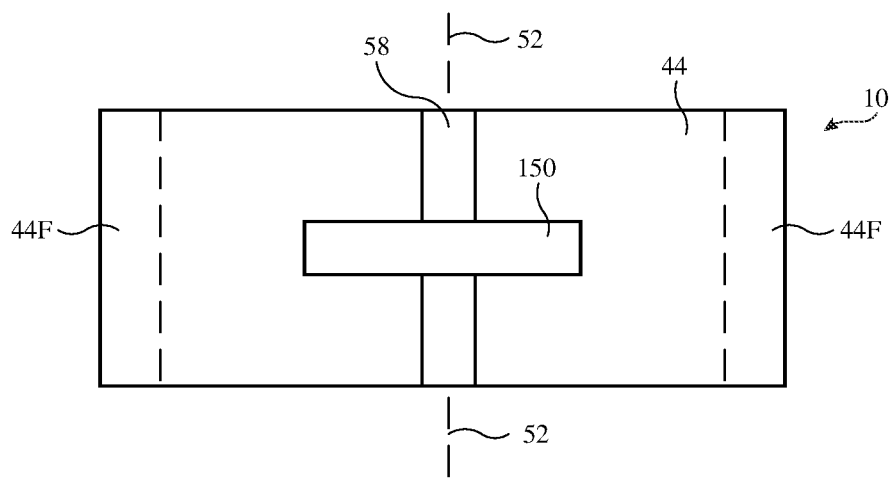
FIG. 18 is a top view of an illustrative finger device that includes bistability structures such as the bistable strip of FIG. 17 in accordance with an embodiment.

In addition to or instead of using magnets to provide device 10 with folding bistability, device 10 may include bistable springs or other bistability components to provide bistability to the folding of device 10. Consider, as an example, bistable spring 150 of FIG. 17. Bistable spring 150, which may be formed from spring metal, polymer, or other suitable material, has a curved-cross-sectional profile and is elongated to form a strip that runs into the page of FIG. 17. Spring 150 exhibits two stable states. In the first stable state, spring 150 has a first shape (e.g., spring 150 may be straight as shown in FIG. 17). In the second stable state, spring 150 is bent into a second shape. For example, spring 150 may be bent about bend axis 52 sufficiently to cause the curved cross-sectional profile of spring 150 to flatten out along at least part of the length of spring 150.

Bistable spring 150 may be used to provide device 10 with folding bistability. For example, spring 150 may span hinge 58 and couple portions of housing 44 on opposing sides of hinge 58 together. When spring 150 is in its first state, side housing portions 44F are moved away from each other and device 10 is unfolded to receive a user's finger. When the user's finger is inserted into device 10 and presses upward on hinge 58, spring 150 bends into its second stable state, allowing side portions 44F to move towards each other. Magnets or other structures may help pull sides 44F together or bistable structures such as spring 150 may help bias sides 44F towards each other as device 10 is folded onto the user's finger.

Figure 19:
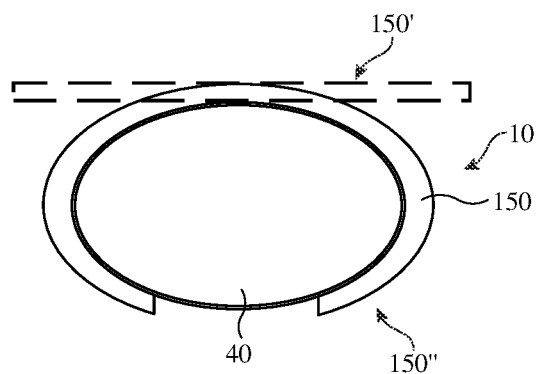
FIG. 19 is a cross-sectional side view of an illustrative finger device having a housing formed from a bistable strip structure in accordance with an embodiment.

In the example of FIG. 19, bistable spring 150 is hollow and contains internal circuitry (see, e.g., control circuitry 12 and other circuitry of device 10 of FIG. 1). Spring 150 may serve as some or all of housing 44 of device 10. In its first stable state, spring 150 is straight (see first stable position 150'). This allows spring 150 to be removed from finger 40. When it is desired to wear device 10, a user may wrap spring 150 fully or partly around finger 40. This causes spring 150 to enter a stabled wrapped state (second stable position 150"), where device 10 is attached to finger 40.

Figure 20:
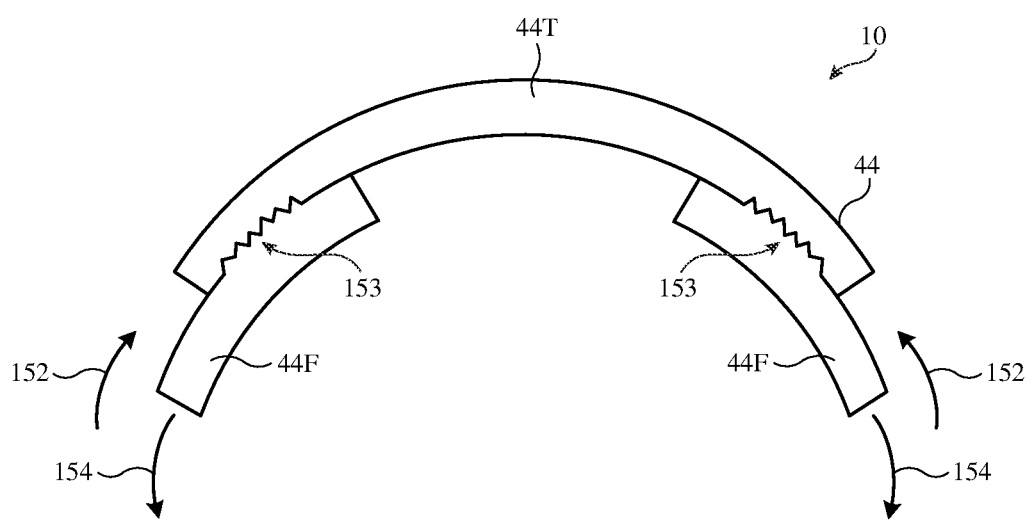
FIG. 20 is a cross-sectional side view of an illustrative finger device with sliding portions in accordance with an embodiment.

As shown in FIG. 20, device 10 may have housing portions that deploy by sliding. In particular, housing 44 of device 10 may have side portions 44F that are slidably engaged with top portion 44T. Structures 153 (e.g., interlocking corrugations, magnets, friction pads, etc.) may be used to help hold fingers 44F in desired locations. When it is desired to remove device 10 from a user's finger, side portions 44F are retracted in directions 152 by sliding portions 44F inwardly. When it is desired to attach device 10 to a user's finger, side portions 44F are extended in directions 154 by sliding portions 44F outwardly to cover side portions of the user's fingertip.

Figure 21:
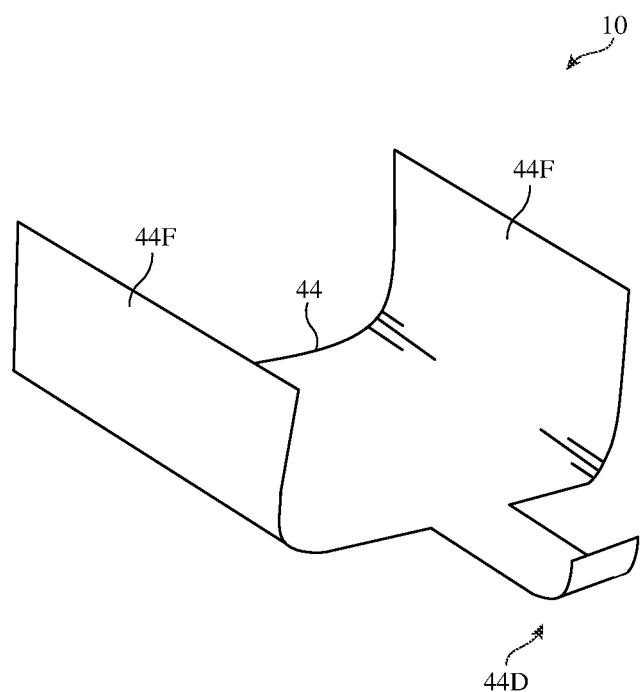
FIG. 21 is a bottom perspective view of an illustrative finger device with a datum reference structure that is configured to engage part of a user's finger in accordance with an embodiment.

Device 10 may be provided with structures that engage portions of finger 40 (e.g., the tip of finger 40, nail 42, portions of finger 40 and/or nail 42 at the cuticle of finger 40, portions of a knuckle of finger 40, etc.). Housing 44 of device 10 may, for example, be provided with a finger engagement structure such as engagement structure 44D of FIG. 21. Engagement structure 44D, which may sometimes be referred to as a reference datum, reference structure, or datum, serves as a datum that helps ensure that housing 44 is positioned in a desired longitudinal alignment with respect to the longitudinal axis of finger 44 when device 10 is being worn (e.g., structure 44D may help locate device 10 at a desired distance back from the tip of finger 40, etc.).

Engagement structure 44D may engage the tip of the user's finger, the user's cuticle, and/or other portions of finger 40.

Figure 22:
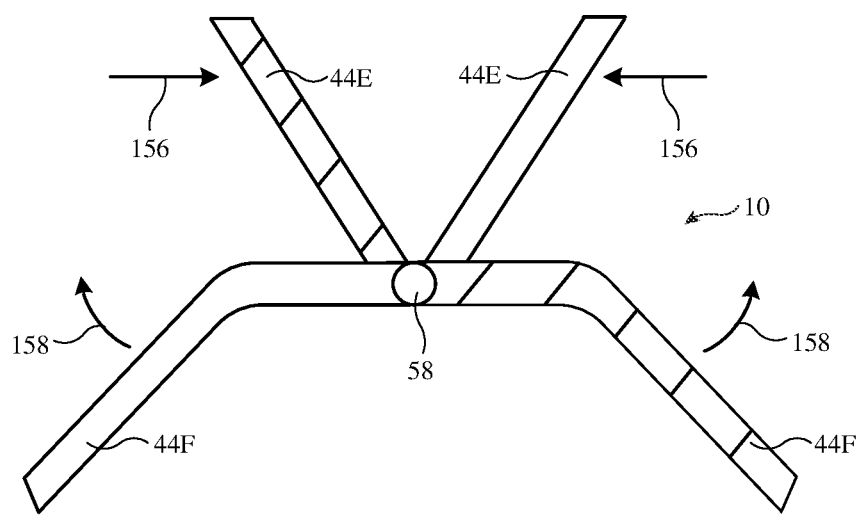
FIG. 22 is a cross-sectional side view of an illustrative finger device in accordance with an embodiment.

FIG. 22 is a cross-sectional side view of device 10 in an illustrative configuration in which housing portions 44F have clip extensions that form a spring-based clip. Hinge 58 may have a spring and/or housing 44 may be provided with magnets that help bias side portions 44F toward each other to fold device 10 onto a user's finger. When it is desired to remove device 10 from the user's finger, the user may squeeze clip extensions 44FE inwardly in directions 156, thereby causing opposing side portions 44F to swing outwardly in directions 158 to release the user's finger.

When device 10 is stored on base 74, base 74 may transfer wireless power to device 10, may transfer power via electrodes that contact mating electrodes in device 10 (e.g., electrodes forming a wired connection), may communicate wirelessly and/or via a wired connection with device 10, may surround and protect device 10 (e.g., when base 74 forms an enclosure for device 10), and may support device 10 in an arrangement that facilitates deployment of device 10 (e.g., using a storage arrangement that has releasable magnets or other deployment structure to help place device 10 onto a user's finger when it is desired to wear device 10). Base 74 may have a power adapter that converts alternating-current power from a wall outlet to direct-current power. This power may then be provided to device 10 wirelessly or via a wired connection to charge a battery in device 10. If desired, base 74 may have a battery that supplies the direct-current power. Base 74 may be configured to rest on a table top or other support surface, may be a wearable device, may be a removable case (e.g., a removable cover or other enclosure formed from fabric, polymer, metal, glass, ceramic, and/or other materials), and/or may have other suitable form factor. In some configurations, head-mounted devices and other electronic devices in system 8 (e.g., device 24 of FIG. 1) may serve as support structures for device 10 (e.g., device 24 can serve as a base for device 10).

Figure 23:
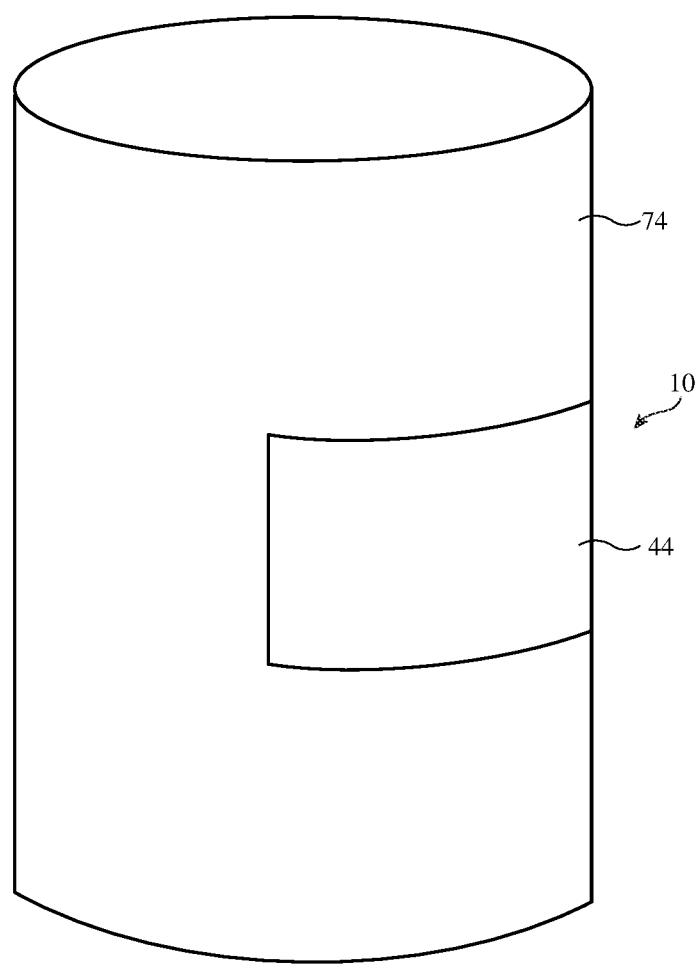
FIG. 23 is a perspective view of an illustrative base in which an illustrative finger device is stored in accordance with an embodiment.

In the example of FIG. 23, base 74 has a cylindrical shape and housing 44 of device 10 is received within a recess in base 74 when stored. Base 74 may have a cube shape, a conical shape, a spherical shape, other shapes, and/or combinations of these shapes. The cylindrical shape of the housing of base 74 of FIG. 23 is illustrative.

Figure 24:
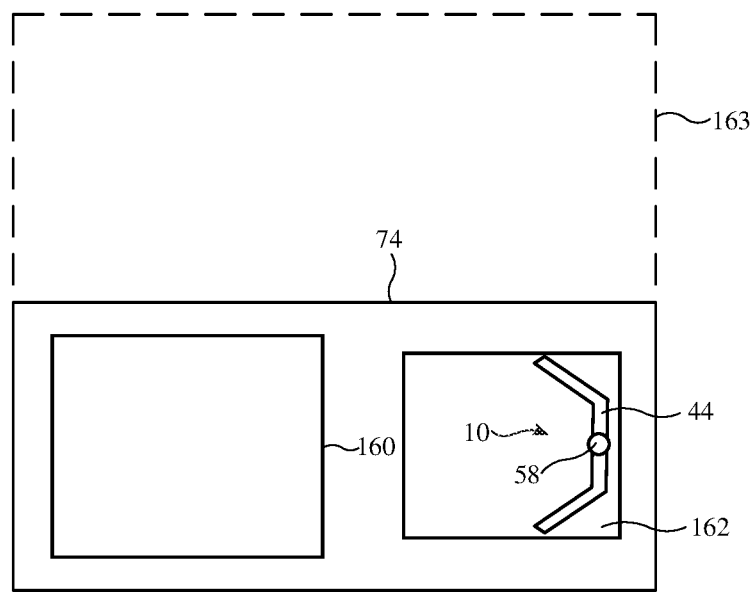
FIG. 24 is a top view of an illustrative removable case such as a removable battery case in which a head-mounted device and a finger device are stored in accordance with an embodiment.

FIG. 24 is a top view of base 74 in an illustrative configuration in which base 74 serves as a removable storage case. In the example of FIG. 24, base 74 has first recess (opening) 160 and second recess (opening) 162. Recess 160 has a size and shape configured to receive electronic device 24 for storage in the interior of base 74. For example, recess 160 may be configured to receive and store a head-mounted device. Recess 162 has a size and shape configured to receive finger device 10 for storage in the interior of base 74, as shown in FIG. 24. Optional lid 163 may be folded to cover recesses 160 and 162 (e.g., to provide added protection). Base 74 may include magnets that are adjacent to an interior surface of recess 162, thereby allowing device 10 to be stored against that surface when inserted in recess 162. Switchable magnets, movable members actuated by a movable finger button, and/or any other suitable deployment structures may be used to help a user fold device 10 onto the user's finger when it is desired to remove device 10 from base 74 for use in system 8.

Figure 25:
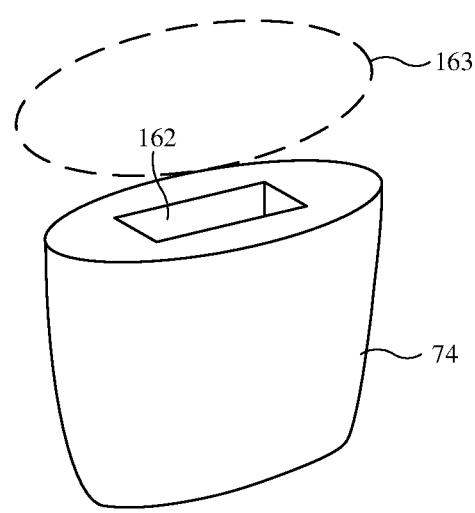
FIG. 25 is a perspective view of an illustrative removable case for storing a finger device in accordance with an embodiment.

FIG. 25 is a perspective view of base 74 in a configuration in which the housing of base 74 has one or more recesses such as recess 162 to receive one or more finger devices 10 but does not include a recess to receive a head-mounted device (as an example). An optional hinged lid such as lid 163 or other movable structure may be used to selectively cover recesses such as recess 162.

Figure 26:
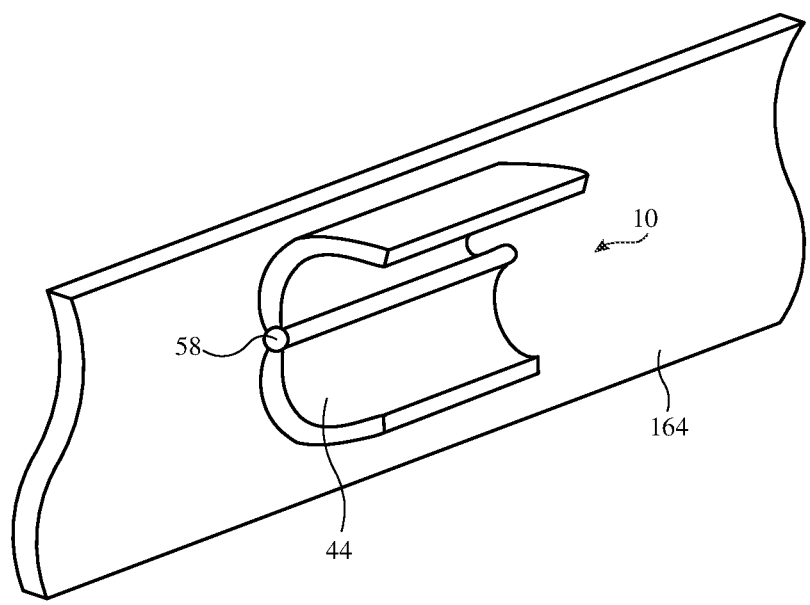
FIG. 26 is a perspective view of an illustrative strap for a head-mounted device that is configured to magnetically attract a finger device for storage in accordance with an embodiment.

If desired, device 10 may be stored on an exterior surface of device 24. As an example, device 24 may be a wearable device such as a head-mounted device with structures that allow device 24 to serve as a base for device 10. As shown in FIG. 26, a head-mounted device may have a head-mounted support structure such as strap 164. Magnets may be mounted in strap 164 to attract corresponding magnets in housing 44. This allows device 10 to be magnetically attached to an outwardly facing surface of strap 164. During use of device 24, a user may place a finger within housing 44. The folding bistability of device 44 allows housing 44 to snap closed on the finger. When it is desired to store device 10 for later use, device 10 can be placed on the exterior of strap 164 (e.g., while a user wears strap 164 and the rest of the head-mounted device on the user's head).

Figure 27:
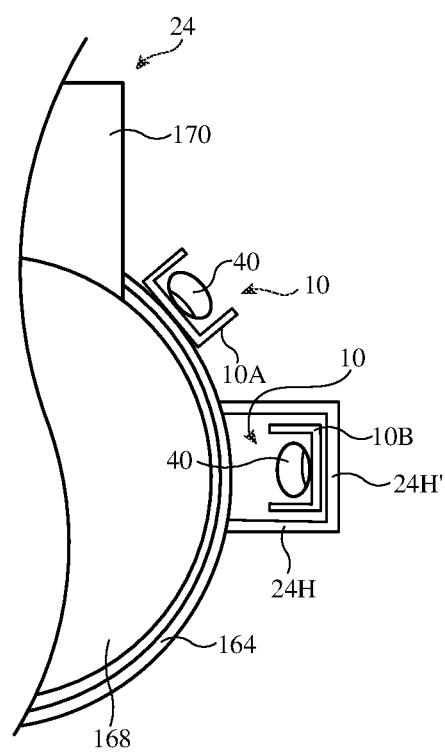
FIG. 27 is a top view of an illustrative head-mounted device with a strap on which finger devices may be removably stored in accordance with an embodiment.

FIG. 27 is a top view of a wearable device configured to store finger devices 10. As shown in FIG. 27, device 24 may include a main unit such as unit 170. Unit 170 may include a display for displaying images for a user, control circuitry, and other circuitry. Unit 170 may be mounted over a user's eyes. Unit 170 and strap 164 may be configured to be worn by a user on the user's head (e.g., head 168).

Strap 164 may contain magnets to magnetically store finger devices. For example, magnets may be placed within strap 164 so that a finger device may be removably stored in a top-down orientation on an exterior surface of strap 164, as shown by illustrative finger device 10A. When a user desires to remove device 10A to wear device 10A on finger 40, the user may insert finger 40 into device 10A with fingernail 42 facing strap 164, as shown in FIG. 27.

If desired, device 24 may have structures such as housing structures 24H with magnets that attract magnets in a finger device. As shown by illustrative device 10B of FIG. 27, the magnets may be located in portion 24H' of housing structures 24H so that device 10B may be stored in structures 24H in a top-up orientation (e.g., an orientation in which the upper portion of housing 44 faces away from strap 164). When a user desires to remove device 10B to wear device 10B on finger 40, the user may insert finger 40 into device 10B with fingernail 42 facing away from strap 164, as shown in FIG. 27. Multiple devices 10 may be stored in top-down and top-up configurations and/or multiple devices 10 may be stored on opposing sides of head 168. The arrangement of FIG. 27 is illustrative.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A finger device configured to be worn on a finger to control a head-mounted device with a display, the finger device comprising:
   sensor circuitry configured to gather finger position information as the finger moves; and
   a foldable housing configured to be coupled to the finger at a tip of the finger while leaving a finger pad at the tip of the finger exposed, wherein the foldable housing has first and second portions coupled by hinge structures, wherein the foldable housing has bistability structures configured to impart folding bistability to the foldable housing, and wherein the bistability structures comprise magnetic bistability structures that are configured to separate the first and second portions away from one another in a first stable state.

2. The finger device defined in claim 1 wherein the bistability structures comprises first and second magnets located respectively in the first and second portions, wherein the first magnet has a first pole and a second pole, wherein the second magnet has a third pole and a fourth pole, and wherein the first pole of the first magnet is configured to attract the fourth pole of the second magnet in: 1) the first stable state in which the foldable housing is unfolded and the first and second housing portions are moved away from each other to open the foldable housing and 2) a second stable state in which the foldable housing is folded and the first and second housing portions are moved towards each other to close the foldable housing.

3. The finger device defined in claim 1 wherein the bistability structures comprise magnetic structures.

4. The finger device defined in claim 1 wherein the bistability structures comprise at least one magnet.

5. The finger device defined in claim 1 wherein the bistability structures comprise a magnetic material with multiple polarization zones forming a magnet array.

6. The finger device defined in claim 1 wherein the bistability structures comprise multiple magnets.

7. The finger device defined in claim 1 wherein the bistability structures are configured to operate in 1) first stable state in which the foldable housing is unfolded and the first and second housing portions are moved away from each other to open the foldable housing and 2) a second stable state in which the foldable housing is folded and the first and second housing portions are moved towards each other to close the foldable housing.

8. The finger device defined in claim 1 wherein the hinge structures include a hinge that couples the first and second housing portions together for rotational motion about a folding axis.

9. The finger device defined in claim 1 wherein the hinge structures include parallel first and second hinges, wherein the housing has a center portion, wherein the first hinge couples the first portion to the center portion for rotation about a first hinge axis, and wherein the second hinge couples the center portion to the second portion for rotation about a second hinge axis.

10. The finger device defined in claim 9 wherein the bistability structures include a first magnet in the first portion, a second magnet in the center portion, and a third magnet in the second portion.

11. The finger device defined in claim 9 wherein the bistability structures include respective magnets in the first and second portions.

12. The finger device defined in claim 9 wherein the bistability structures include at least three magnets.

13. The finger device defined in claim 9 wherein the bistability structures include at least one magnet.

14. The finger device defined in claim 1 wherein the first and second portions comprise, respectively first and second side housing portions configured to press against respective first and second opposing sides of the finger.

15. The finger device defined in claim 1 wherein the first housing portion has a first gear and wherein the second housing portion has a second gear that engages the first gear to synchronize motion between the first and second housing portions as the housing is folded and unfolded.

16. The finger device defined in claim 1 further comprising a coil configured to receive wireless power signals from a base, wherein the bistability structure comprise magnets configured to attract magnets in the base.

17. A system, comprising:
a foldable finger device that is wearable on a finger while controlling external equipment, wherein the finger device has first and second housing portions coupled by hinge structures and has first and second respective magnets in the first and second housing portions that separate the first and second housing portions away from one another in a first stable state and that move the first and second housing portions towards one another in a second stable state; and
an item configured to store the foldable finger device, the item comprising:
a magnet that is configured to attract the first magnet of the foldable finger device; and
support structures that support the magnet and that are configured to support the foldable finger device for storage while the magnet attracts the first magnet of the foldable finger device.

18. The system defined in claim 17 wherein the support structures comprise a portion of a head-mounted device.

19. The system defined in claim 18 wherein the support structures comprise a strap in the head-mounted device.

20. The system defined in claim 17 wherein the support structures have a button configured to move when pushed by the finger to close foldable finger device.

21. The system defined in claim 20 wherein the support structures include movable members, wherein the button is configured to move the movable members when the button is pushed by the finger, and wherein the movable members are configured to move the first and second housing portions towards each other to fold the foldable finger device onto the finger in response to the button being pushed.

22. The system defined in claim 17 further comprising wireless power circuitry configured to wirelessly transmit power to the finger device while the finger device is supported by the support structures for storage.

23. The system defined in claim 17 wherein the magnet comprises a first magnet of a pair of magnets in the item, wherein the first magnet of the pair of magnets and a second magnet of the pair of magnets are configured to attract, respectively, the first and second magnets of the finger device while the finger device is stored on the support structures.

24. The system defined in claim 23 wherein the first and second magnets of the pair of magnets comprises switchable magnets and wherein the item comprises control circuitry configured to control the switchable magnets to release the finger device from the switchable magnets.

25. The system defined in claim 17 wherein the magnet is configured to release the first magnet of the finger device when the finger device is moved relative to the support structures so that the magnet and the first magnet are not aligned.

26. A finger device configured to be worn on a finger, the finger device comprising;
a foldable housing configured to be coupled to the finger, wherein the foldable housing has first and second portions coupled by hinge structures, wherein the foldable housing has magnets configured to impart folding bistability to the foldable housing, and wherein the foldable housing is operable in a stable unfolded state in which the magnets move the first and second portions away from one another and is operable in a stable folded state in which the magnets move the first and second portions towards one another to attach the foldable housing to the finger;
a sensor configured to gather finger input as the finger moves the housing; and
wireless communications circuitry configured to wirelessly transmit the finger input.

27. The finger device defined in claim 26 wherein the magnets include first and second magnets, where the hinge structures comprise a hinge that couples the first portion to the second portion for rotation about a hinge axis, wherein the first magnet is in the first portion, and wherein the second magnet is in the second portion.

28. The finger device defined in claim 26 wherein the magnets include first, second, and third magnets, wherein the housing has a center portion, wherein the hinge structures comprises a first hinge that couples the first portion to the center portion and a second hinge that couples the center portion to the second portion, wherein the first magnet is in the first portion, the second magnet is in the center portion, and the third magnet is in the third portion.

* * * * *

UNITED STATES PATENT AND TRADEMARK OFFICE
CERTIFICATE OF CORRECTION

| | | |
|---|---|---|
| PATENT NO. | : 11,360,587 B1 | Page 1 of 1 |
| APPLICATION NO. | : 17/183210 | |
| DATED | : June 14, 2022 | |
| INVENTOR(S) | : Wang et al. | |

It is certified that error appears in the above-identified patent and that said Letters Patent is hereby corrected as shown below:

In the Claims

Column 20, Line 61, "comprises" should read -- comprise --

Column 21, Line 56, "structure" should read -- structures --

Column 22, Line 16, "to close foldable finger device." should read -- to close the foldable finger device. --

Column 22, Line 36, "comprises" should read -- comprise --

Column 23, Line 4, "comprises" should read -- comprise --

Signed and Sealed this
Twentieth Day of September, 2022

Katherine Kelly Vidal
*Director of the United States Patent and Trademark Office*